(12) United States Patent
Luo (10) Patent No.: US 9,286,113 B2
(45) Date of Patent: Mar. 15, 2016

(54) METHOD, APPARATUS, AND SYSTEM FOR ISSUING PARTITION BALANCING SUBTASK

(71) Applicant: Huawei Technologies Co., Ltd., Shenzhen (CN)

(72) Inventor: Xiong Luo, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 14/136,007

(22) Filed: Dec. 20, 2013

(65) Prior Publication Data

US 2015/0007183 A1  Jan. 1, 2015

Related U.S. Application Data

(63) Continuation of application No. PCT/CN2013/078510, filed on Jun. 29, 2013.

(51) Int. Cl.
*G06F 9/48* (2006.01)

(52) U.S. Cl.
CPC .................................. *G06F 9/4806* (2013.01)

(58) Field of Classification Search
None
See application file for complete search history.

(56) References Cited

U.S. PATENT DOCUMENTS

| 9,053,167 B1* | 6/2015 | Swift ................ G06F 17/30584 |
| 2004/0260862 A1 | 12/2004 | Anderson |
| 2007/0245110 A1 | 10/2007 | Shibayama et al. |
| 2011/0099146 A1* | 4/2011 | McAlister et al. ............ 707/634 |
| 2011/0307903 A1* | 12/2011 | Vaddagiri ..................... 718/105 |
| 2012/0179771 A1 | 7/2012 | Ganti et al. |
| 2013/0054806 A1* | 2/2013 | Francis ............... H04L 67/1002 709/226 |
| 2013/0218847 A1* | 8/2013 | Saika ............................ 707/692 |
| 2013/0332608 A1* | 12/2013 | Shiga .................... G06F 9/5088 709/226 |

FOREIGN PATENT DOCUMENTS

| CN | 102968498 A | 3/2013 |
| CN | 102999537 A | 3/2013 |
| CN | 103164167 A | 6/2013 |
| CN | 103229487 A | 7/2013 |
| JP | 2007286709 A | 11/2007 |
| JP | 2010266993 A | 11/2010 |
| JP | 2011082690 A | 4/2011 |

OTHER PUBLICATIONS

Zhang, Gui-gang et al., "Massive Data Resources Management Framework in the Cloud Environment," Systems Engineering—Theory & Practice, vol. 31, Sup. 2, Oct. 2011, 5 pages.
Foreign Communication From a Counterpart Application, PCT Application No. PCT/CN2013/078510, Chinese Search Report dated Mar. 6, 2014, 6 pages.
Foreign Communication From a Counterpart Application, PCT Application No. PCT/CN2013/078510, Chinese Written Opinion dated Mar. 6, 2014, 4 pages.
Dai Kobayashi et.al. Replica-assisted Migration: a method to handle workload skew on distributed storage systems, IPSJ SIG Technical Report, Japan, Information Processing Society of Japan, Jul. 14, 2004, vol. 2004 No. 72, 521-528. Total 9 pages.

* cited by examiner

*Primary Examiner* — Tuan Dao
(74) *Attorney, Agent, or Firm* — Huawei Technologies Co., Ltd.

(57) ABSTRACT

A method, an apparatus, and a system for issuing a partition balancing subtask, which are applied to a controller and may be used to implement migration of a partition between nodes. After receiving a second partition balancing task, the controller generates a second partition balancing subtask set, where the second partition balancing subtask set includes at least one partition balancing subtask, and each partition balancing subtask records: a migration partition, a node to which the migration partition belongs, and a destination node; searches a current partition balancing subtask set, and deletes a repeated partition balancing subtask between the second partition balancing subtask set and the current partition balancing subtask set; and issues remaining partition balancing subtasks after the repeated partition balancing subtask is deleted to the destination node recorded in each partition balancing subtask.

15 Claims, 3 Drawing Sheets

METHOD, APPARATUS, AND SYSTEM FOR ISSUING PARTITION BALANCING SUBTASK

CROSS-REFERENCE TO RELATED APPLICATIONS

This application is a continuation of International Application No. PCT/CN2013/078510, filed on Jun. 29, 2013, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the field of information technologies, and in particular, to a task processing technology.

BACKGROUND OF THE INVENTION

With the development of computer technologies and network technologies, an amount of information tends to grow by geometric progression, data of human beings reaches an unprecedented scale, and storage and management of such super-large-scale data becomes a great challenge in the industry. When the super-large-scale data is stored and managed in a traditional centralized manner, a high-efficiency read/write operation cannot be provided, and high expansibility and high availability cannot be met. In such a background, various storage systems formed by multiple storage nodes have emerged.

In a storage system formed by multiple storage nodes, generally multiple copies of same data are stored to avoid data loss caused by a single-point failure; therefore, an urgent requirement of the system is to keep the number of data copies stable. In addition, as people's requirement for sustainable working of storage systems is quickly growing day after day, online capacity expansion of a distributed storage system becomes an indispensable part of basic functions of the system. Then, how to issue a data recovery task in a case of system data damage becomes a focus of a current technology.

SUMMARY OF THE INVENTION

The present invention provides a method, an apparatus, and a system for issuing a partition balancing subtask, so that a partition migration task may be issued.

In a first aspect, an embodiment of the present invention provides a method for issuing a partition balancing subtask. The method is applied to a controller, the controller and at least two nodes form a storage system, and each node includes at least one partition. The method includes: generating a second partition balancing subtask set after a second partition balancing task is received, where the second partition balancing subtask set includes at least one partition balancing subtask, and each partition balancing subtask records: a migration partition, a node to which the migration partition belongs, and a destination node; searching a current partition balancing subtask set, and deleting a repeated partition balancing subtask between the second partition balancing subtask set and the current partition balancing subtask set; and issuing each partition balancing subtask in the second partition balancing subtask set after the repeated partition balancing subtask is deleted to the destination node recorded in each partition balancing subtask.

In a first possible implementation manner of the first aspect, before the issuing the partition balancing subtask, the method further includes: deleting a partition balancing subtask that cannot be completed from the current partition balancing subtask set, where the partition balancing subtask that cannot be completed includes a partition balancing subtask whose node to which a migration partition belongs is faulty and a partition balancing subtask whose destination node is faulty.

In a second aspect, an embodiment of the present invention provides an apparatus for issuing a partition balancing subtask. The apparatus includes: a partition balancing subtask generating module, configured to generate a second partition balancing subtask set after a second partition balancing task is received, where the second partition balancing subtask set includes at least one partition balancing subtask, and each partition balancing subtask records: a migration partition, a node to which the migration partition belongs, and a destination node; a partition balancing subtask deleting module, configured to search a current partition balancing subtask set, and delete a repeated partition balancing subtask between the second partition balancing subtask set and the current partition balancing subtask set; and a partition balancing subtask issuing module, configured to issue each partition balancing subtask in the second partition balancing subtask set after the repeated partition balancing subtask is deleted to the destination node recorded in each partition balancing subtask.

In a first possible implementation manner of the second aspect, a partition balancing subtask that cannot be completed is deleted from the current partition balancing subtask set, where the partition balancing subtask that cannot be completed includes a partition balancing subtask whose node to which a migration partition belongs is faulty and a partition balancing subtask whose destination node is faulty.

According to a third aspect, an embodiment of the present invention provides a storage system, including the apparatus for issuing a partition balancing subtask according to the second aspect or the first possible implementation manner of the second aspect, and further including at least two nodes, where the nodes are configured to, after the partition balancing subtasks are received, execute the partition balancing subtasks as destination nodes of the partition balancing subtasks.

According to a fourth aspect, an embodiment of the present invention provides a method for issuing a partition balancing subtask. The method is applied to a controller, the controller and at least two nodes form a storage system, and each node includes at least one partition. The method includes: generating a second partition balancing subtask set after a second partition balancing task is received, where the second partition balancing task is a partition balancing task generated because of a fault occurring on a node, the second partition balancing subtask set includes at least one partition balancing subtask, and each partition balancing subtask records: a migration partition, a node to which the migration partition belongs, and a destination node; searching a current partition balancing subtask set, and deleting a partition balancing subtask that cannot be completed from the current partition balancing subtask set, where the partition balancing subtask that cannot be completed includes a partition balancing subtask whose migration partition belongs to the faulty node and a partition balancing subtask whose destination node is the faulty node; and issuing each partition balancing subtask in the second partition balancing subtask set after a repeated partition balancing subtask is deleted to the destination node recorded in each partition balancing subtask.

In a first possible implementation manner of the fourth aspect, before the issuing the partition balancing subtask, the method further includes: deleting the repeated partition balancing subtask between the second partition balancing subtask set and the current partition balancing subtask set.

According to a fifth aspect, an embodiment of the present invention provides an apparatus for issuing a partition balancing subtask. The apparatus includes: a partition balancing subtask generating module, configured to generate a second partition balancing subtask set after a second partition balancing task is received, where the second partition balancing task is a partition balancing task generated because of a fault occurring on a node, the second partition balancing subtask set includes at least one partition balancing subtask, and each partition balancing subtask records: a migration partition, a node to which the migration partition belongs, and a destination node; a partition balancing subtask deleting module, configured to search a current partition balancing subtask set, and delete a partition balancing subtask that cannot be completed from the current partition balancing subtask set, where the partition balancing subtask that cannot be completed includes a partition balancing subtask whose migration partition belongs to the faulty node and a partition balancing subtask whose destination node is the faulty node; and a partition balancing subtask issuing module, configured to issue each partition balancing subtask in the second partition balancing subtask set after a repeated partition balancing subtask is deleted to the destination node recorded in each partition balancing subtask.

In a first possible implementation manner of the fifth aspect, the repeated partition balancing subtask between the second partition balancing subtask set and the current partition balancing subtask set is deleted.

By applying the embodiments of the present invention, in a case that currently a partition balancing subtask exists, a partition balancing subtask may continue to be issued, thereby implementing concurrent processing of a preceding partition balancing subtask and a succeeding partition balancing subtask.

BRIEF DESCRIPTION OF THE DRAWINGS

To illustrate the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and other drawings may be further obtained according to these accompanying drawings.

DETAILED DESCRIPTION OF THE EMBODIMENTS

The following clearly and completely describes the technical solutions of the present invention with reference to the accompanying drawings in the embodiments of the present invention. Apparently, the embodiments to be described are merely a part rather than all of the embodiments of the present invention. All other embodiments obtained based on the embodiments of the present invention shall fall within the protection scope of the present invention.

In a distributed storage system formed by nodes and a controller, if some of the nodes are faulty, data on these faulty nodes is migrated to other normal nodes, thereby ensuring reliability of data in the entire system. This migration task may be called a partition balancing task. The partition balancing task is a task for migrating a partition between nodes.

In an existing data migration operation, after a first node is faulty, a corresponding partition balancing task of the first node is executed; and if a second node is faulty before the partition balancing task of the first node ends, a partition balancing task of the second node can be executed only after the partition balancing task of the first node ends.

Because a very long time is taken to execute a partition balancing task and may be dozens of hours or even longer, the second node always fails to execute a partition balancing task and data on the second node always fails to be recovered in such a long time, causing a severe decrease in reliability of the entire distributed storage system.

In an embodiment of the present invention, a storage system includes a controller and multiple nodes. For example, the storage system includes at least two nodes or at least three nodes, and these nodes include a first node and a second node. The controller is connected to the nodes in the storage system, and controls these storage nodes. A node is formed by storage media, such as a central processing unit (CPU), a memory, and a hard disk, and is configured to store data. A storage node may also be called a node for short.

A node may store data, data may be represented by a value, an identifier may be represented by a key, and a combination of a key and a corresponding value is called a key-value. There is at least one partition on each node. For example, the entire storage system is divided into a total of 20 partitions P0 to P19, a certain Hash range is divided for each partition, Hash calculation is performed on a key of data, and then, it may be determined, according to a Hash range to which a calculated Hash value belongs, to store a key-value that corresponds to the Hash value onto a certain node.

After the key-value is stored onto the node, multiple copies may be stored for each partition to form a copy group, and content of a copy in a same copy group is the same. When data damage occurs on one or more copies, recovery may be performed through any of the remaining partitions. A node to which each partition specifically belongs may be determined according to a partition balancing algorithm. A copy in a same copy group may be located on different nodes or different racks, or in different equipment rooms, and reliability of the system may be improved by scattered storage of the copies. For example, a partition 10 on a node 1 is simultaneously stored on a node 2 and a node 3. If three copies of a same partition are stored, such a backup manner may be called three copies. In another case, a partition may also be unique in the entire storage system. That is to say, there is no any other copy.

A partition balancing task is a task to change distribution of partitions on nodes. The partition balancing task may be executed to migrate a partition from a node to another node, that is, migrate data in a partition to another node. In the following embodiments, that a node fault triggers a partition balancing task is taken as an example, and a partition lost due to the node fault is re-generated through migration.

In an actual case, the triggering may also be performed for another reason. For example, when a new node is added in the storage system for system capacity expansion, migrating some partitions from an existing node to the newly-added node may be triggered. A difference lies in that: when a partition balancing task triggered by a node fault is executed, a copy of a partition on a faulty node needs to be found and the copy is used as a migration partition; while for system capacity expansion, the step of searching for a copy does not exist but a migration partition is directly migrated. A partition balancing task may also be triggered by a change to any factor, such as a decrease in the number of nodes in the storage system, data coldness or hotness, performance of a node, or a network bandwidth provided by a node.

Figure 1:
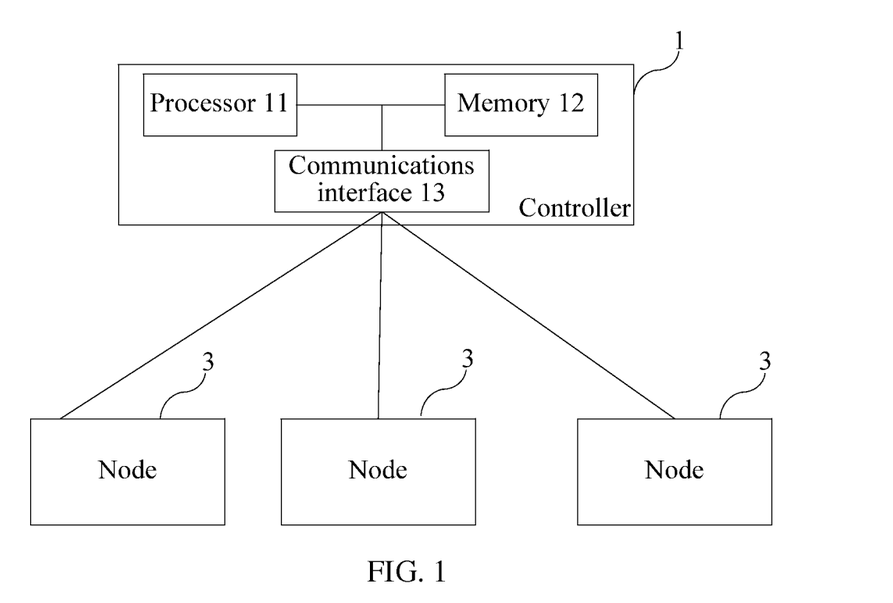
FIG. 1 is a schematic structural diagram of a controller according to an embodiment.

FIG. 1 is a schematic structural diagram of a controller 1 according to an embodiment of the present invention, where the controller 1 is connected to at least two nodes 3. The controller includes a processor 11, a memory 12, and an interface 13, and the three are connected to each other. The interface 13 is connected to each of the nodes 3, the memory 12 is configured to store a program, the processor 11 is configured to execute the program, and a code of the program includes a computer operation command. The executing, by the processor 11, the program is specifically used to implement a method in the following embodiment.

Figure 2:
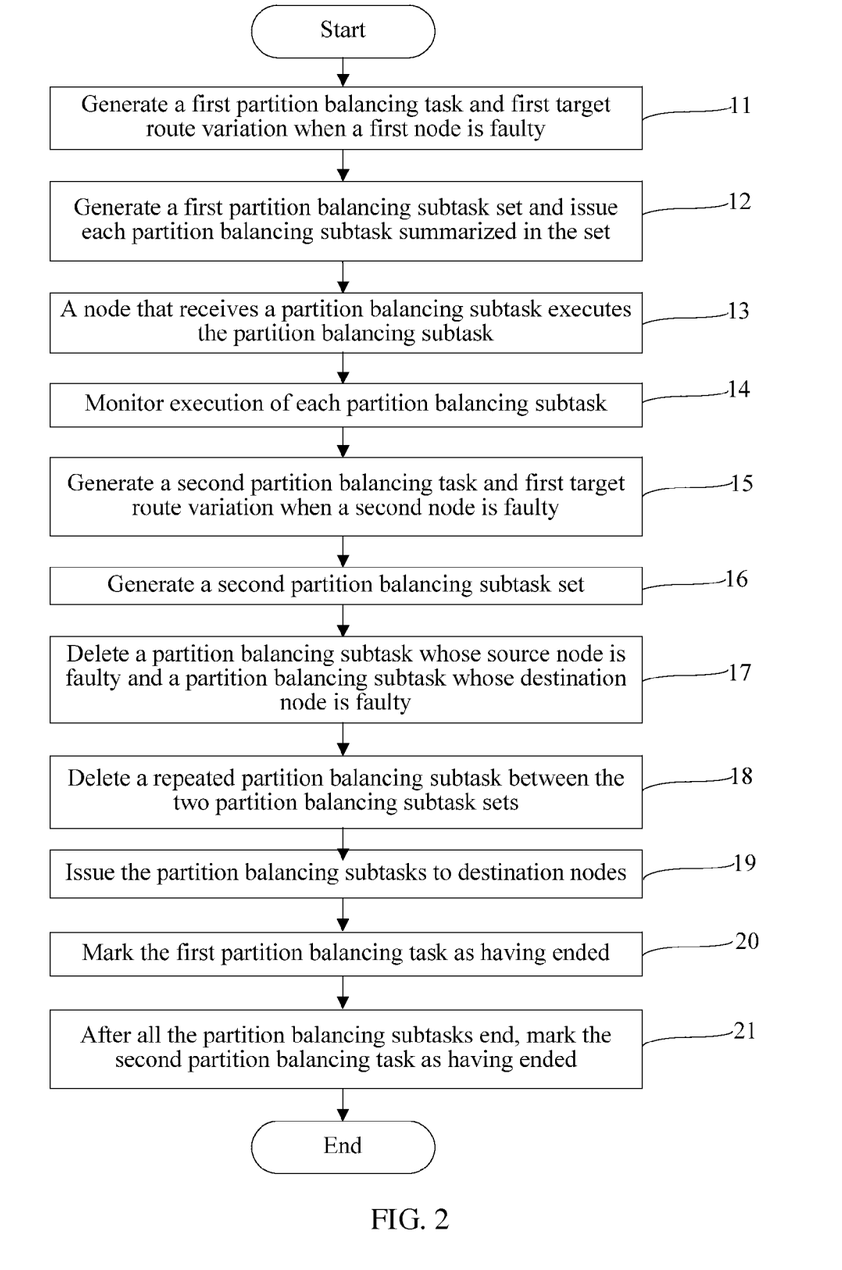
FIG. 2 is a flowchart of a method for issuing a partition balancing subtask according to an embodiment.

Referring to FIG. 2, FIG. 2 is a flowchart of a method for issuing a partition balancing subtask according to an embodiment of the present invention. A process of executing a partition balancing task includes the following steps.

Step 11: When a first node is faulty, a controller generates a first partition balancing task. After generating the first partition balancing task, the controller calculates first target partition distribution information, queries current partition distribution information, and generates first target partition distribution information variation according to the current partition distribution information and the first target partition distribution information. The first target partition distribution information variation is a change to partition distribution information, where the change is necessary for the current partition distribution information to become the first target partition distribution information; and the first target partition distribution information variation may be formed by node partition distribution information variation of each node. The node partition distribution information variation of each node records correspondence between a migration partition and a destination node of the migration partition, and the destination node is a node to which the migration partition needs to be migrated. For the partition distribution information variation and the node partition distribution information variation, reference may also be made to step 15 in this embodiment. In this embodiment, the partition distribution information is used to describe distribution of partitions on nodes in a storage system, and may specifically be distribution of data corresponding to Key values in partitions on physical nodes. The current partition distribution information records correspondence between each node and partitions on each node at a current moment; the target partition distribution information records correspondence between each node and partitions on each node after the first partition balancing task is executed, and specifically, is correspondence between each node and partitions on each node after partition migration is executed according to the first partition balancing task; and the partition distribution information variation records migration partitions that need to be migrated for the current partition distribution information to become the target partition distribution information, and a destination node of each migration partition. The first target partition distribution information is partition distribution information that needs to be formed, and is partition distribution information that may be generated by using a partition distribution information algorithm according to information, such as a current node, partition distribution information, and an available state of a node. In a process of executing a partition balancing subtask in a first partition balancing subtask set, the current partition distribution information is gradually updated; and the first target partition distribution information becomes the current partition distribution information after all partition balancing subtasks are executed. The controller may record an available state of each node. If a state is available, it indicates that the node can provide a read/write service; and if the state is unavailable, it indicates that the node cannot provide a read/write service, for example, a hard disk is faulty, the node is powered off, or the like.

Step 12: The controller searches for a source node of each migration partition according to the partition distribution information variation, where the source node is a node out of which the migration partition needs to be migrated. The first partition balancing subtask set is generated according to migration partitions, source nodes of the migration partitions, and destination nodes of the migration partitions. When a same migration partition exists on multiple nodes, any one of the nodes is selected as a source node of the migration partition. Then each partition balancing subtask in the first partition balancing subtask set is sent to a destination node recorded in the partition balancing subtask. The first partition balancing subtask set is a set of partition balancing subtasks that need to be executed for partition distribution information of the storage system to change from the current partition distribution information to the first target partition distribution information. In this embodiment, after the first node is faulty, the controller records a mark of each partition on the first node; and partitions of same marks as those of partitions on the first node, that is, a copy of the partitions on the first node, exist on another node. These partitions are migration partitions. In this step, if there is more than one copy, the controller searches, by using marks of the migration partitions, for nodes where any copy is located, and selects one of the nodes as the source node.

The first partition balancing subtask set is generated on a basis of the first partition balancing task, and includes at least one partition balancing subtask. Each partition balancing subtask records a migration partition, and a source node and a destination node of the migration partition. The source node is a node out of which data is migrated; the migration partition is a partition out of which data is migrated on the source node; and the destination node is a node that receives the migration partition. After the destination node receives the partition balancing subtask, the migration partition on the source node is migrated to the destination node. After all the partition balancing subtasks generated for the partition balancing task end, ending of the partition balancing task may be marked. A manner of ending a partition balancing subtask may be completion or termination.

In this embodiment of the present invention, the migrating or the migrating-out refers to that generating a new partition that is the same as a migration partition in a manner of copying, where the migration partition is a partition that is copied, may be kept and may also be deleted. For example, for migration triggered by a node fault, the migration partition may be kept on the source node; and for migration triggered by capacity expansion, the migration partition may be deleted from the source node.

In this embodiment of the present invention, node partition distribution information forms the partition distribution information. The node partition distribution information refers to correspondence between a node and partitions stored on the node, and may also be construed as distribution of partitions on a certain node. For example, <node 1; partition 0, partition 100> indicates that there are two partitions, a partition 0 and a partition 100 on a node 1; similarly, <node 2; partition 1, partition 101> indicates that there are two partitions, a partition 1 and a partition 101 on a node 2; and <node 3; partition 3, partition 301> indicates that there are two partitions, a partition 3 and a partition 301, on a node 3. It is assumed that the node 1 needs to be offline, and therefore, a task of migrating the partition 0 and the partition 100 is triggered. According to a partition balancing algorithm, generated target partition distribution information may include two pieces of node partition distribution information: <node 2; partition 1, partition 101, partition 0> and <node 3; partition 3, partition 301, partition 100>.

Accordingly, a balancing subtask needs to be established for migration of each partition. Therefore, two subtasks may be established, and, respectively, are a partition balancing subtask for migrating the partition 0 on the node 1 to the node 2 and a partition balancing subtask for migrating the partition 100 on the node 1 to the node 3. When the two partition balancing subtasks are completed, the target partition distribution information becomes actual partition distribution information in the storage system, that is, the current partition distribution information. In another embodiment, a partition balancing subtask may also be used to migrate multiple partitions. For example, a partition balancing subtask may be used to migrate all migration partitions on a source node. When a partition balancing subtask includes multiple migration partitions, the partition balancing subtask records a source node and a destination node that correspond to each migration partition.

After the first node is faulty, the partitions on the first node are no longer available, and a copy that is of the partitions on the first node and is located on another node is sought to serve as migration partitions. The found copy is migrated by executing a partition balancing task, and a new copy is generated. This is equivalent to recovering the partitions on the first node.

In this embodiment of the present invention, partitions available for the migration and nodes to which the partitions belong are sought according to the first target partition distribution information variation. When more than one partition is available for the migration, any one of the partitions is selected as a migration partition. In another embodiment, after partitions available for the migration are sought, only a partition with complete data integrity information is selected as a migration partition, and a partition with incomplete data integrity is not selected as a migration partition.

Each partition may have data integrity information, and this information may be recorded in the controller. The data integrity information is used to mark whether data of a partition is complete. A partition in a complete state indicates that this partition can be migrated, a node to which the partition belongs may serve as a source node of a partition balancing subtask, and data of all partitions may be set to complete by default; a partition in an incomplete state indicates that data on the partition is incomplete and cannot be migrated. For example, the partition is being generated and this partition may be marked as complete after the generation is complete.

Here, an example is taken to describe data integrity of a partition. It is assumed that there is a partition balancing subtask for migrating data of a partition P from a node B to a node A. Then in a migration process, the partition P on the node A is a partition with incomplete data, and therefore, cannot serve as a migration node of another partition balancing subtask; however, after the migration ends, the partition P on the node A is a partition with complete data.

Step 13: A node that receives a partition balancing subtask sent by the controller, that is, the destination node in the partition balancing subtask, executes data migration, so that the migration partition on the source node is copied to the destination node according to information carried by the partition balancing subtask. In this embodiment, a partition on the first node is a migration partition and a copy of this migration partition exists on another node; therefore, in this step, the copy that is of this partition of the first node and is on the another node is copied to a destination node. A process of executing each partition balancing subtask is as follows: (1) A destination node sends a request message to a source node, requesting migration of data of a partition P on the source node, where the partition P is a copy of a partition on the first node; (2) because the source node records data key-values that belong to the partition P, after receiving the message, the source node searches keys of all data on the source node itself and sends all data that belongs to the partition P to the destination node; and (3) after receiving the data from the source node, the destination node writes the data into a disk of the destination node for storage, and then the migration is complete.

In addition, in this step, after receiving the partition balancing subtask sent by the controller, the destination node sends a response message to the controller. After receiving the response message, the controller updates the information in the partition balancing subtask into the partition distribution information, so that the information becomes a part of the current partition distribution information. That is to say, there is no need to wait for completion of the partition balancing subtask, and instead the partition distribution information may be updated to a state that is after the completion of the partition balancing subtask.

Step 14: The controller monitors execution of each partition balancing subtask, and cancels monitoring of a partition balancing subtask that is already executed. A monitoring method may be as follows: the controller periodically sends a query request to each destination node, and if a response message from a destination node shows that a partition balancing subtask has been executed, the controller marks ending of the partition balancing subtask, no longer monitors the partition balancing subtask, and deletes the partition balancing subtask from a partition balancing subtask list; and if the response message shows that a partition balancing subtask is not yet executed, continues to monitor the partition balancing subtask.

The foregoing description is about creation and execution of the first partition balancing task. If a second partition balancing task can be executed only after the first partition balancing task ends, the second partition balancing task always fails to be executed before the first partition balancing task ends, thereby causing an excessively long waiting time for the execution of the second partition balancing task and lowering system reliability. In this embodiment of the present invention, the second partition balancing task starts to be executed before the first partition balancing task ends or before all the subtasks in the first partition balancing subtask set end. That is to say, in this embodiment of the present invention, two partition balancing tasks may be concurrently executed.

Step 15: A second node is faulty, and the controller generates a second partition balancing task. The controller generates second target partition distribution information according to the second partition balancing task, where the second target partition distribution information includes at least one piece of node partition distribution information. The controller queries the current partition distribution information, compares the current partition distribution information with the second target partition distribution information, and finds second partition distribution information variation that is necessary for the current partition distribution information to become the target partition distribution information, where the partition distribution information variation is formed by the node partition distribution information variation of each node. This step is the same as step 11 in terms of principles, and reference may be made to step 11 mutually.

For the node A, R1 represents node partition distribution information of the node A in the current partition distribution information, and R2 represents node partition distribution information of the node A in the second target partition distribution information. Then for the node A, the node partition distribution information variation is: $R3=R2-(R2 \cap R1)$.

For example, the node partition distribution information of the node A in the current partition distribution information is <node A; partition 100, partition 200, partition 300, partition 400>, and the node partition distribution information of the node A in the second target partition distribution information is <node A; partition 300, partition 400, partition 500, partition 600>. Then according to the calculation formula $R3=R2-(R2 \cap R1)$, the node partition distribution information variation of the node A is <node A; partition 500, partition 600>.

In step 15, there are two manners of generating the node partition distribution information variation R3. One is that the R2 is generated first and then excessive partition distribution information is deleted by using the formula $R3=R2-(R2 \cap R1)$; and the other is that the node partition distribution information variation is calculated first by using the formula $P3=P2-(P2 \cap P1)$, and then the node partition distribution information variation is directly generated. It should be noted that because the controller updates the current partition distribution information after receiving a response from the node to a partition balancing subtask, the current partition distribution information found through querying in step 15 is different from the current partition distribution information found through querying in step 11.

Step 16: The controller searches, according to the second partition distribution information variation, for migration partitions that are necessary for forming the second target partition distribution information and a node to which each migration partition belongs, and generates a second partition balancing subtask set, where the second partition balancing subtask set is a set of partition balancing subtasks that need to be executed for the partition distribution information of the storage system to change from the current partition distribution information to the second target partition distribution information. This step is the same as step 12 in terms of principles, and reference may be made to step 12 mutually.

In this step, if multiple candidate partitions are available for the migration when the controller is generating the second partition balancing subtask set, a node to which a partition whose data integrity is complete is selected as the source node, and the second partition balancing subtask set is generated together in combination with the partition distribution information variation in step 15. It should be noted that, step 15 and the selecting a node to which a partition whose integrity is complete as the source node in this step may be concurrent in terms of an executing sequence, or either may be executed first. For a partition migration task triggered by a node fault, the following steps are taken as an example to describe how a specific partition balancing subtask is generated in step 16.

(161) Find all copies of a migration partition according to a copy mapping rule. For example, the mapping rule is as follows: copies of a partition P exist on a node to which a partition P+1 belongs and a node to which a partition P+2 belongs, and there are altogether three copies. Then for a partition 10, partitions where copies of the partition 10 is located are a partition 11 and a partition 12, and a found copy list is {10,11,12}. When any one of the three copies is faulty, recovery may be performed by using any one of the remaining partitions.

(162) Detect states and data integrity of nodes where the copies found in step 161 are located. If a state of a node is unavailable or copy data of a node is incomplete, the node cannot be used as the source node; and if a state of a node is available and integrity of partitions is complete, the node can be used as the source node. For example, in the first partition balancing subtask set, a migration partition that corresponds to a partition balancing subtask being executed is an incomplete partition. If the partition 10 is faulty, of two copies of the partition 10, the partition 11 is a complete partition and the partition 12 is an incomplete partition. Then, a node to which the partition 11 belongs is used as the source node of the partition balancing subtask, and the partition 11 is used as the migration partition of the partition migration subtask.

(163) A source node, a migration partition, and a destination node of the migration partition 11 may be learned from the node partition distribution information variation in step 15. The three together form the partition migration subtask. A partition balancing subtask in the second partition balancing subtask set may be recorded in a partition balancing subtask list of the controller. That is to say, a partition balancing subtask is generated from source node information and node partition distribution information variation together.

Step 17: The controller deletes a partition balancing subtask whose source node is faulty and a partition balancing subtask whose destination node is faulty from the first partition balancing subtask set, because these partition balancing subtasks cannot be completed and faults of the source node or the destination node are all caused by a fault of the second node. That is to say, before the second node is faulty, these partition balancing subtasks are partition balancing subtasks that can be completed; and after the second node is faulty, these partition balancing subtasks are partition balancing subtasks that cannot be completed.

Step 18: Delete a repeated partition balancing subtask between the second partition balancing subtask set and the current partition balancing subtask set. The current partition balancing subtask set includes partition balancing subtasks that are not yet executed in the first partition balancing subtask set. A same partition balancing subtask exists between the first partition balancing subtask set and the second partition balancing subtask set; therefore, in this step the excessive partition balancing subtask is deleted to avoid repeated execution of the partition balancing subtask. Either of step 17 and step 18 may be executed, or both may be executed; and if both are executed, there is no time sequence between the two steps, that is, the two steps may be concurrently executed or either may be executed first.

Merging of the first partition balancing task and the second partition balancing task is implemented through step 17 and step 18, and existence of the first partition balancing task does not hinder execution of the second partition balancing task.

Step 19: The controller issues the partition balancing subtasks in the second partition balancing subtask set after the processing in step 17 and step 18 to destination nodes.

Similarly, these issued partition balancing subtasks are executed by their respective destination nodes, and are also recorded in the partition balancing subtask list for the controller to monitor their completion. For details about how the controller and the nodes specifically process the partition balancing subtasks, reference may be made to step 13 and step 14.

Step 20: The controller may mark the first partition balancing task as having ended and stop monitoring the first partition balancing task. In the prior art, after receiving a partition balancing subtask, each node returns a response message to a controller; and the controller can mark a partition balancing task as having ended only after receiving all subtasks response messages of the partition balancing task. In this embodiment of the present invention, it is unnecessary to determine whether the response messages have been received but the first partition balancing task may be marked as having ended after step 19 is executed. This step is an optional step.

Optionally, a node that receives a partition balancing subtask executes the partition balancing subtask as a destination node of the partition balancing subtask. For a detailed executing method, reference may be made to the substeps (1), (2), and (3) of step 13.

Step 21: After all the partition balancing subtasks end, the controller may mark the second partition balancing task as having ended and stop monitoring the second partition balancing task. This step is an optional step.

It should be noted that, because concurrent execution of two partition balancing tasks is taken as an example in this embodiment of the present invention, the solution provided in this embodiment of the present invention may be applied to any two partition balancing tasks triggered adjacently when there are more than two partition balancing tasks. Therefore, the solution provided in the present invention also applies to a case when more than two partition balancing tasks are concurrently executed, for example, that three storage controllers are faulty one after another. Specifically, when three partition balancing tasks occur in turn, this is basically similar to this embodiment and equivalent to executing step 14, namely step 21, for a third partition balancing task after step 20, and the original step 21 is no longer executed.

Still referring to FIG. 2, an embodiment of the present invention provides a method for issuing a partition balancing subtask. The method is applied to a controller, the controller and at least two nodes form a storage system, and each node includes at least one partition. The method includes: generating a second partition balancing subtask set after a second partition balancing task is received, where the second partition balancing subtask set includes at least one partition balancing subtask, and each partition balancing subtask records: a migration partition, a node to which the migration partition belongs, and a destination node; searching a current partition balancing subtask set, and deleting a repeated partition balancing subtask between the second partition balancing subtask set and the current partition balancing subtask set; and issuing each partition balancing subtask in the second partition balancing subtask set after the repeated partition balancing subtask is deleted to the destination node recorded in each partition balancing subtask.

Before the issuing the partition balancing subtask, the method further includes: deleting a partition balancing subtask that cannot be completed from the current partition balancing subtask set, where the partition balancing subtask that cannot be completed includes a partition balancing subtask whose node to which a migration partition belongs is faulty and a partition balancing subtask whose destination node is faulty.

The generating a second partition balancing subtask set according to a second partition balancing task may specifically include: calculating target partition distribution information of the storage system after the second partition balancing task is received; searching current partition distribution information of the storage system; obtaining partition distribution information variation according to the current partition distribution information and the target partition distribution information, where the current partition distribution information records correspondence between each node and partitions on the node, the target partition distribution information records correspondence between each node and partitions on the node after partition migration is performed, and the partition distribution information variation records migration partitions that need to be migrated for the current partition distribution information to become the target partition distribution information, and a destination node of each migration partition; and selecting a node to which a migration partition belongs for each migration partition, and generating the second partition balancing subtask set according to a node to which each migration partition belongs and the partition distribution information variation.

The selecting a node to which a migration partition belongs for each migration partition may specifically be: when multiple partitions are available for the migration, detecting integrity of data of the partitions, and selecting a node to which a migration partition with complete data belongs.

The generating the second partition balancing subtask set may specifically be: generating, through calculation, the second partition balancing subtask set before a first partition balancing task ends, where the current partition balancing subtask set includes partition balancing subtasks being executed in the first partition balancing subtask set.

After the issuing step, the method may further include: marking a first partition balancing task as having ended before response messages of the partition balancing subtasks are received.

After the issuing step, the method may further include: executing, by a node that receives a partition balancing subtask, the partition balancing subtask as a destination node of the partition balancing subtask.

After the issuing step, the method may further include: receiving a response message of a storage node for the partition balancing subtasks, and updating the current partition distribution information to a state that is after successful execution of the partition balancing subtasks.

Figure 3:
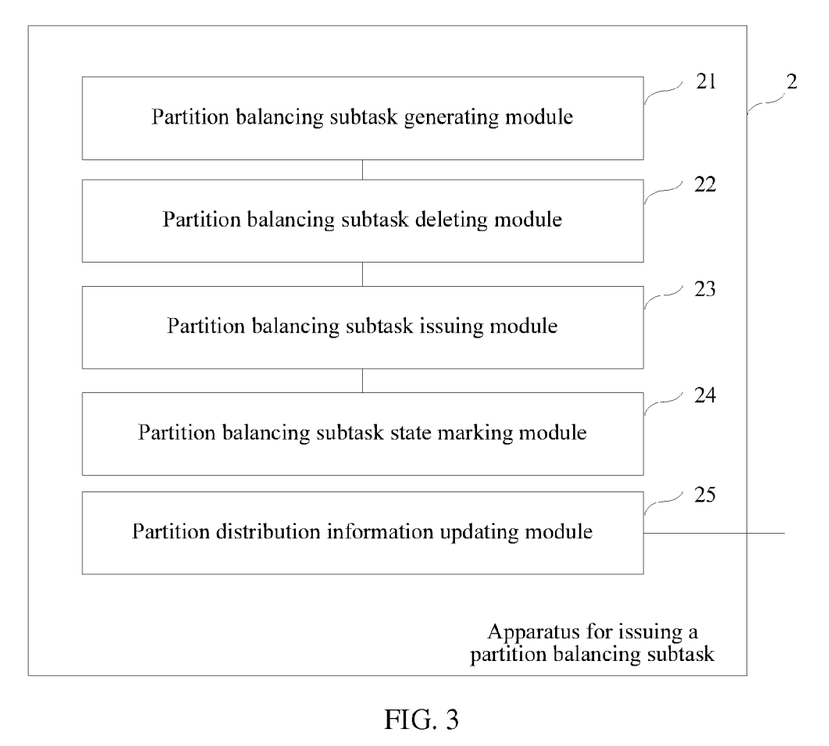
FIG. 3 is a schematic structural diagram of an apparatus for issuing a partition balancing subtask according to an embodiment.

Referring to FIG. 3, an embodiment of the present invention further provides an apparatus 2 for issuing a partition balancing subtask, to which the foregoing method may be applied. For example, the apparatus 2 may be a controller or another electronic device that has a control function. The apparatus 2 includes a partition balancing subtask generating module 21, a partition balancing subtask deleting module 22, and a partition balancing subtask issuing module 23. Optionally, the apparatus 2 may further include a partition balancing subtask state marking module 24; and optionally, may further include a partition distribution information updating module 25.

The partition balancing subtask generating module 21 is configured to generate a second partition balancing subtask set after a second partition balancing task is received, where the second partition balancing subtask set includes at least one partition balancing subtask, and each partition balancing subtask records: a migration partition, a node to which the migration partition belongs, and a destination node.

The partition balancing subtask deleting module 22 is connected to the partition balancing subtask generating module 21, and configured to search a current partition balancing subtask set and delete a repeated partition balancing subtask between the second partition balancing subtask set and the current partition balancing subtask set.

The partition balancing subtask issuing module 23 is connected to the partition balancing subtask deleting module 22, and configured to issue each partition balancing subtask in the second partition balancing subtask set after the repeated partition balancing subtask is deleted to the destination node recorded in each partition balancing subtask.

The partition balancing subtask deleting module 22 may be further configured to: delete a partition balancing subtask that cannot be completed from the current partition balancing subtask set, where the partition balancing subtask that cannot be completed includes a partition balancing subtask whose node to which a migration partition belongs is faulty and a partition balancing subtask whose destination node is faulty.

The partition balancing subtask generating module 21 may be specifically configured to: after the second partition balancing task is received, calculate target partition distribution information of the storage system; search current partition distribution information of the storage system; obtain partition distribution information variation according to the current partition distribution information and the target partition distribution information, where the current partition distribution information records correspondence between each node and partitions on the node, the target partition distribution information records correspondence between each node and partitions on the node after partition migration is performed, and the partition distribution information variation records migration partitions that need to be migrated for the current partition distribution information to become the target partition distribution information, and a destination node of each migration partition; and select a node to which a migration partition belongs for each migration partition, and generate the second partition balancing subtask set according to a node to which each migration partition belongs and the partition distribution information variation.

The selecting, by the partition balancing subtask generating module 21, a node to which a migration partition belongs for each migration partition is specifically: when multiple partitions are available for the migration, detecting integrity of data of the partitions, and selecting a node to which a migration partition with complete data belongs.

The partition balancing subtask generating module 21 is specifically configured to: generate, through calculation, the second partition balancing subtask set before a first partition balancing task ends and after the second partition balancing task is received, where the current partition balancing subtask set includes partition balancing subtasks being executed in the first partition balancing subtask set.

The apparatus 2 may further include the partition balancing subtask state marking module 24, which is connected to the partition balancing subtask issuing module 23 and configured to, after each partition balancing subtask is issued and before response messages of the partition balancing subtasks are received, mark the first partition balancing task as having ended.

The apparatus 2 may further include the partition distribution information updating module 25, which is connected to a storage node and configured to receive a response message of the storage node for the partition balancing subtasks, and update the current partition distribution information to a state that is after successful execution of the partition balancing subtasks.

Figure 4:
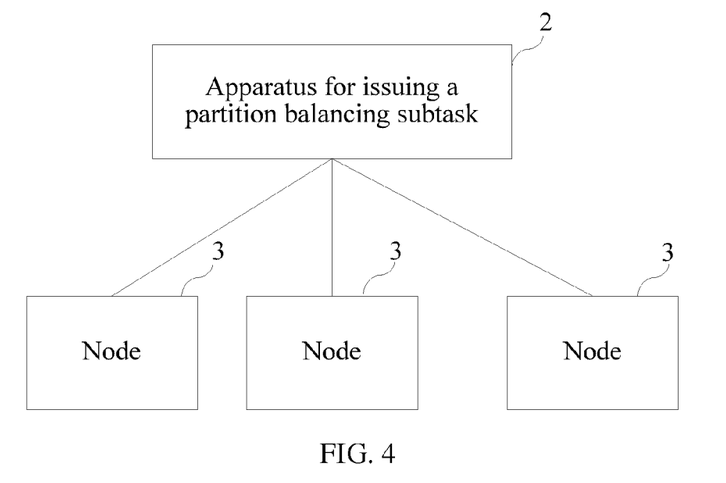
FIG. 4 is a schematic structural diagram of a storage system for issuing a partition balancing subtask.

Referring to FIG. 4, an embodiment of the present invention further provides a storage system, including the apparatus for issuing a partition balancing subtask 2 and at least two nodes 3, where the nodes 3 are configured to, after the partition balancing subtasks are received, execute the partition balancing subtasks as destination nodes of the partition balancing subtasks.

Through the foregoing description of the implementation manners, it is clear that the present invention may be implemented by software plus necessary universal hardware, and definitely may also be implemented by hardware, but in many cases, the former is a preferred implementation manner. Based on such understanding, the technical solutions of the present invention essentially, or the part contributing to the prior art may be implemented in a form of a software product. The computer software product is stored in a readable storage medium, for example, a floppy disk, a hard disk, or an optical disk of a computer, and includes several instructions for instructing a computer device (which may be a personal computer, a server, or a network device, or the like) to perform the methods described in the embodiments of the present invention.

The foregoing descriptions are merely specific implementation manners of the present invention, but are not intended to limit the protection scope of the present invention. Any variation or replacement figured out by any person within the technical scope disclosed in the present invention shall fall within the protection scope of the present invention. Therefore, the protection scope of the present invention shall be subject to the protection scope of the claims.

What is claimed is:

1. A method for issuing a partition balancing subtask, applied to a controller, wherein the controller and at least two nodes form a storage system, and wherein each node comprises a partition, the method comprises:

generating a second partition balancing subtask set after a second partition balancing task is received, wherein the second partition balancing subtask set comprises a partition balancing subtask, and wherein the partition balancing subtask records: a migration partition, a node to which the migration partition belongs, and a destination node;

searching a current partition balancing subtask set;

deleting a repeated partition balancing subtask between the second partition balancing subtask set and the current partition balancing subtask set; and issuing the partition balancing subtask in the second partition balancing subtask set after the repeated partition balancing subtask is deleted to the destination node recorded in the partition balancing subtask;

wherein the generating the second partition balancing subtask set according to the second partition balancing task comprises:

calculating target partition distribution information of the storage system after the second partition balancing task is received;

searching a current partition distribution information of the storage system;

obtaining a partition distribution information variation according to the current partition distribution information and the target partition distribution information, wherein the current partition distribution information records correspondence between each node and partitions on the node, wherein the target partition distribution information records correspondence between each node and the partitions on the node after partition migration is performed, and wherein the partition distribution information variation records the migration partition that needs to be migrated for the current partition distribution information to become the target partition distribution information and the destination node of the migration partition;

selecting the node to which the migration partition belongs; and generating the second partition balancing subtask set according to the node to which the migration partition belongs and the partition distribution information variation.

2. The method according to claim 1, wherein before the issuing the partition balancing subtask, the method further comprises: deleting the partition balancing subtask from the current partition balancing subtask set when the partition balancing subtask cannot be completed, and wherein the partition balancing subtask cannot be completed when the node to which a migration partition belongs is faulty and the destination node is faulty.

3. The method according to claim 1, wherein the selecting the node to which the migration partition belongs comprises: detecting integrity of data of the partitions when multiple partitions are available for the migration and selecting the node to which the migration partition with a complete data belongs.

4. The method according to claim 1, wherein the generating a second partition balancing subtask set comprises generating, through calculation, the second partition balancing subtask set before a first partition balancing task ends, and wherein the current partition balancing subtask set comprises one or more partition balancing subtasks being executed in the first partition balancing subtask set.

5. The method according to claim 1, wherein after the issuing step, the method further comprises executing, by the destination node that receives the partition balancing subtask, the partition balancing subtask.

6. The method according to claim 1, wherein after the issuing step, the method further comprises: receiving a response message of the storage node for the partition balancing subtask and updating the current partition distribution information to a state that is after successful execution of the partition balancing subtask.

7. A controller for issuing a partition balancing subtask, comprising:
a memory;
a processor coupled to the memory, wherein the memory includes instructions that when executed by the processor cause the controller to perform the following:
generate a second partition balancing subtask set after a second partition balancing task is received, wherein the second partition balancing subtask set comprises at least one partition balancing subtask, and wherein each of the partition balancing subtasks record: a migration partition, a node to which the migration partition belongs, and a destination node;
search a current partition balancing subtask set;
delete a repeated partition balancing subtask between the second partition balancing subtask set and the current partition balancing subtask set; and
issue each of the partition balancing subtasks in the second partition balancing subtask set after the repeated partition balancing subtask is deleted to the destination node recorded in each of the partition balancing subtasks;

wherein the controller and at least two nodes form the storage system, wherein each node comprises at least one partition, and wherein the instructions executed by the processor further cause the controller to generate the second partition balancing subtask set according to the second partition balancing task by:

calculating a target partition distribution information of the storage system after the second partition balancing task is received;

searching a current partition distribution information of the storage system; and obtaining a partition distribution information variation according to the current partition distribution information and the target partition distribution information, wherein the current partition distribution information records correspondence between each node and partitions on the node, wherein the target partition distribution information records correspondence between each node and partitions on the node after partition migration is performed, and wherein the partition distribution information variation records the migration partitions that need to be migrated for the current partition distribution information to become the target partition distribution information, and the destination node of each migration partition;

selecting a node to which the migration partition belongs for each of the migration partitions; and generating the second partition balancing subtask set according to the node to which each of the migration partitions belong and the partition distribution information variation.

8. The controller according to claim 7, before the issuing the partition balancing subtask, the instructions executed by the processor further cause the controller to:
delete a partition balancing subtask that cannot be completed from the current partition balancing subtasks, wherein the partition balancing subtask that cannot be completed comprises a partition balancing subtask whose node to which the migration partition belongs is faulty and a partition balancing subtask whose destination node is faulty.

9. The controller according to claim 7, wherein the instructions executed by the processor further cause the controller to select the node to which the migration partition belongs for each of the migration partitions by: detecting an integrity of data of the partitions when multiple partitions are available for the migration and selecting the node to which a migration partition with a complete data belongs.

10. The controller according to claim 7, wherein the instructions executed by the processor further cause the controller to generate the second partition balancing subtask set by generating, through calculation, the second partition balancing subtask set before a first partition balancing task ends, wherein the current partition balancing subtask set comprises one or more partition balancing subtasks being executed in a first partition balancing subtask set.

11. The controller according to claim 7, wherein after the issuing, the instructions executed by the processor further cause the controller to: receive a response message of a storage node for the partition balancing subtasks and update the current partition distribution information to a state that is after successful execution of the partition balancing subtasks.

12. A storage system, comprising:
a controller for issuing a partition balancing subtask; and
at least two nodes, wherein each of the nodes are configured to, after the partition balancing subtask are received, execute the partition balancing subtask as a destination node of the partition balancing subtask;

wherein the controller comprises:

a memory;

a processor coupled to the memory, wherein the memory includes instructions, and the controller is configured to execute the instructions to perform operations of:

generating a second partition balancing subtask set after a second partition balancing task is received, wherein the second partition balancing subtask set comprises the partition balancing subtask, and wherein the partition balancing subtask records: a migration partition, a node to which the migration partition belongs, and a destination node;

searching a current partition balancing subtask set; and deleting a repeated partition balancing subtask between the second partition balancing subtask set and the current partition balancing subtask set; and issuing the partition balancing subtask in the second partition balancing subtask set after the repeated partition balancing subtask is deleted to the destination node recorded in the partition balancing subtask;

wherein each node comprises at least one partition, and when the instructions executed by the processor the controller is further configured to generate the second partition balancing subtask set according to the second partition balancing task by:

calculating a target partition distribution information of the storage system after the second partition balancing task is received;

searching a current partition distribution information of the storage system; and obtaining a partition distribution information variation according to the current partition distribution information and the target partition distribution information, wherein the current partition distribution information records correspondence between each node and partitions on the node, wherein the target partition distribution information records correspondence between each node and partitions on the node after partition migration is performed, and wherein the partition distribution information variation records the migration partitions that need to be migrated for the current partition distribution information to become the target partition distribution information, and the destination node of each migration partition;

selecting a node to which the migration partition belongs for each of the migration partitions; and generating the second partition balancing subtask set according to the node to which each of the migration partitions belong and the partition distribution information variation.

13. A method for issuing a partition balancing subtask, applied to a controller, wherein the controller and at least two nodes form a storage system, and wherein each node comprises a partition, the method comprises:

generating a second partition balancing subtask set after a second partition balancing task is received, wherein the second partition balancing subtask set comprises a partition balancing subtask, and wherein the partition balancing subtask records: a migration partition, a node to which the migration partition belongs, and a destination node;

searching a current partition balancing subtask set;

deleting a repeated partition balancing subtask between the second partition balancing subtask set and the current partition balancing subtask set; and issuing the partition balancing subtask in the second partition balancing subtask set after the repeated partition balancing subtask is deleted to the destination node recorded in the partition balancing subtask;

wherein after the issuing step, the method further comprises marking a first partition balancing subtask as having ended before a response message of the partition balancing subtask is received.

14. A controller for issuing a partition balancing subtask, comprising:

a memory;

a processor coupled to the memory, wherein the memory includes instructions that when executed by the processor cause the controller to perform the following:

generate a second partition balancing subtask set after a second partition balancing task is received, wherein the second partition balancing subtask set comprises at least one partition balancing subtask, and wherein each of the partition balancing subtasks record: a migration partition, a node to which the migration partition belongs, and a destination node;

search a current partition balancing subtask set;

delete a repeated partition balancing subtask between the second partition balancing subtask set and the current partition balancing subtask set; and issue each of the partition balancing subtasks in the second partition balancing subtask set after the repeated partition balancing subtask is deleted to the destination node recorded in each of the partition balancing subtasks;

wherein after the issuing, the instructions executed by the processor further cause the controller to mark a first partition balancing subtask as having ended before one or more response messages of the partition balancing subtasks are received.

15. A storage system, comprising:

a controller for issuing a partition balancing subtask; and at least two nodes, wherein each of the nodes are configured to, after the partition balancing subtask are received, execute the partition balancing subtask as a destination node of the partition balancing subtask;

wherein the controller is configured to execute the following steps:

generating a second partition balancing subtask set after a second partition balancing task is received, wherein the second partition balancing subtask set comprises the partition balancing subtask, and wherein the partition balancing subtask records: a migration partition, a node to which the migration partition belongs, and a destination node;

searching a current partition balancing subtask set; and deleting a repeated partition balancing subtask between the second partition balancing subtask set and the current partition balancing subtask set; and issuing the partition balancing subtask in the second partition balancing subtask set after the repeated partition balancing subtask is deleted to the destination node recorded in the partition balancing subtask;

wherein after the issuing, the controller is further configured to mark a first partition balancing subtask as having ended before one or more response messages of the partition balancing subtasks are received when the instructions executed by the processor.

* * * * *